United States Patent
Müller

(10) Patent No.: US 7,182,323 B2
(45) Date of Patent: Feb. 27, 2007

(54) ARRANGEMENT WITH A HEIGHT-ADJUSTABLE COMPONENT

(75) Inventor: Thomas Müller, Siershahn (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/760,791

(22) Filed: Jan. 19, 2004

(65) Prior Publication Data

US 2005/0156366 A1  Jul. 21, 2005

(51) Int. Cl.
*F16F 1/00* (2006.01)
*F16M 13/00* (2006.01)

(52) U.S. Cl. .................. 267/131; 267/124; 267/64.12; 248/631; 297/344.19

(58) Field of Classification Search ............ 267/64.11, 267/64.28, 64.12, 131, 120, 124, 126, 129; 248/631, 161, 162.1; 297/344.19; 188/316, 188/317

See application file for complete search history.

(56) References Cited

U.S. PATENT DOCUMENTS

| | | | |
|---|---|---|---|
| 4,240,619 A | | 12/1980 | Wirges et al. |
| 4,433,759 A | | 2/1984 | Ichinose |
| 5,887,857 A | * | 3/1999 | Perrin ..................... 267/64.12 |
| 6,435,112 B1 | | 8/2002 | Insalaco |

FOREIGN PATENT DOCUMENTS

| | | | |
|---|---|---|---|
| DE | 1 978 730 | | 2/1968 |
| DE | 296 14 295 U1 | | 11/1996 |
| DE | 29614295 U1 | * | 11/1996 |
| DE | 101 25 995 A1 | | 11/2002 |
| DE | 10247032 A1 | * | 4/2004 |
| EP | 0 768 476 B1 | | 4/1997 |
| JP | 8 140 745 | | 6/1996 |

* cited by examiner

*Primary Examiner*—Pam Rodriguez
(74) *Attorney, Agent, or Firm*—Cohen Pontani Lieberman & Pavane LLC

(57) ABSTRACT

An arrangement with a height-adjustable component includes an approximately vertically extending upright which bears the component, the upright including a pneumatic spring. The pneumatic spring has a cylinder having a bottom end connected to a fixed part of the arrangement. A piston displaceably arranged in the cylinder subdivides the cylinder into a bottom cylinder chamber and a top cylinder chamber and has a piston rod at one end. The piston rod projects through the top cylinder chamber and is guided out of the top end of the cylinder and bears the component at its free end. The top and bottom cylinder chambers are filled with a gas filling, under positive pressure, which subjects the piston to an upwardly directed push-out force corresponding approximately to the opposing weight-induced force of the component. A valve allows a gas flow from the top into the bottom cylinder chamber and blocks the same in the opposite flow direction. A manually actuable connecting valve selectively connects the bottom and the top chambers.

13 Claims, 1 Drawing Sheet

ARRANGEMENT WITH A HEIGHT-ADJUSTABLE COMPONENT

BACKGROUND OF THE INVENTION

1. Field of the Invention

The invention relates to a table with a height-adjustable component, wherein an approximately vertically extending upright bears the component and is designed as a pneumatic spring.

2. Description of the Related Art

In arrangements including tables which have a height-adjustable table tops used for a hospital bed and having their table top projecting over the hospital bed, it is possible, when the bed is raised, for the bed to come into abutment against the underside of the table top and, when the bed is raised further, to lift off the foot part of the table from the floor. This easily results in the table tilting over.

SUMMARY OF THE INVENTION

The object of the invention is to provide an arrangement including a height-adjustable table top which allows a smooth adjustment of the component into a higher position when the height-adjustable component is forced in the upward direction.

This object is achieved according to the invention by a pneumatic spring for supporting a table top that has a cylinder having a bottom end connected to a fixed part of the table arrangement, the pneumatic spring having arranged therein a piston displaceable within the cylinder which subdivides the cylinder into a bottom and a top cylinder chamber and has a piston rod at one end. The piston rod projects through the top cylinder chamber and is guided out of the top end of the cylinder and bears the table top component at its free end. A gas filling, under positive pressure, in the top and the bottom cylinder chambers subjects the piston to an upwardly directed push-out force corresponding approximately to the opposing weight-induced force of the component. The piston has a valve which allows a gas flow from the top into the bottom cylinder chamber and blocks the same in the opposite flow direction. The pneumatic spring further includes a manually actuable connecting valve by means of which the bottom and top chambers can be connected to one another.

The piston is subjected to an upwardly directed push-out force by the larger active surface of the piston on the side which is directed towards the bottom cylinder chamber in relation to the active surface on the side which is directed towards the top cylinder chamber, the latter active surface being reduced by the cross section of the piston rod, and by virtue of the positive pressure of the gas filling. This push-out force is counteracted by the weight-induced force of approximately equal magnitude of the height-adjustable component such that the table top component which, with the exception of the weight-induced force, is not subjected to loading is in a floating state.

If the table top component is additionally loaded in the push-in direction of the pneumatic spring, then a gas flow from the bottom into the top cylinder chamber is blocked by the valve and the component is retained in position.

If, however, the pneumatic spring is loaded in the push-out direction, the gas is allowed to flow from the top into the bottom cylinder chamber and the table top component can easily be adjusted into a higher position. If the valve has a large cross section, then this also largely avoids resistance by a throttle action of the valve.

This allows the table top component to be raised smoothly with only a low raising force being necessary. A new height position can be set in a stepless manner. In a straightforward design with only a small number of structural parts, a radially encircling groove may be formed on the radially encircling lateral surface of the piston, the radially encircling groove being connected to the bottom cylinder chamber. Furthermore, an elastomeric sealing ring with a smaller axial extent than the groove may be arranged in the groove in an axially movable manner, wherein a connection between the groove and the top cylinder chamber may be blocked by this sealing ring when the pneumatic spring is subjected to a push-in force.

If the external diameter of the sealing ring corresponds approximately to the internal diameter of the cylinder, then it may additionally serve for sealing the piston in relation to the inner wall of the cylinder.

A straightforward construction is achieved here if a connection between the groove and the top cylinder chamber is an annular gap between the radially encircling lateral surface of the piston and the inner wall of the cylinder on that side of the groove which is directed towards the top cylinder chamber.

The groove has a blind end and two side walls, the blind end comprising a base of the groove. If the side wall of the groove which is directed towards the top cylinder chamber is inclined wholly or partially in the direction of the top cylinder chamber, then, during a push-in movement of the pneumatic spring, the sealing ring is forced in the radially outward direction in addition to being forced axially by the gas pressure of the bottom cylinder chamber, this resulting in extremely reliable closing of the valve. It is thus ensured that the component being supported by the pneumatic spring, i.e., the table top, remains in the assumed position even if it is loaded to a relatively pronounced extent in the push-in direction.

To ensure unobstructed flow through the open valve, and thus smooth movement of the table top component in the raising direction, an annular space which is connected to the bottom cylinder chamber may be formed between the blind end of the groove and the radially encircling inner surface of the sealing ring.

For this purpose, the groove may be connected to the bottom cylinder chamber by one or more connection channels.

For manually actuable lowering of the height-adjustable table top component, it is easily possible for a connecting valve to be arranged in the piston and to be opened by a manually displaceable valve tappet which is guided in a displaceable manner through a coaxial bore in the piston rod in the direction of the free end of the piston rod.

The connecting valve is opened here by manual displacement of the valve tappet, such that gas flows from the bottom cylinder chamber into the top cylinder chamber and the piston is lowered when the table top component is subjected to a low level of force in the push-in direction.

If the connecting valve has a closing member which can be forced in the closing direction by the pressure of the bottom cylinder chamber, then the action of loading the height-adjustable component in the push-in direction results in the closing force of the connecting valve increasing and thus in the component remaining more reliably in its assumed position.

The top end of the cylinder may be closed by a sealing guide unit through which the piston rod is guided, with sealing action, in a displaceable manner.

The bottom end of the cylinder is preferably closed by a base. If the arrangement is a table and the height-adjustable component is a table top, then the bottom end of the cylinder may be connected to a foot part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
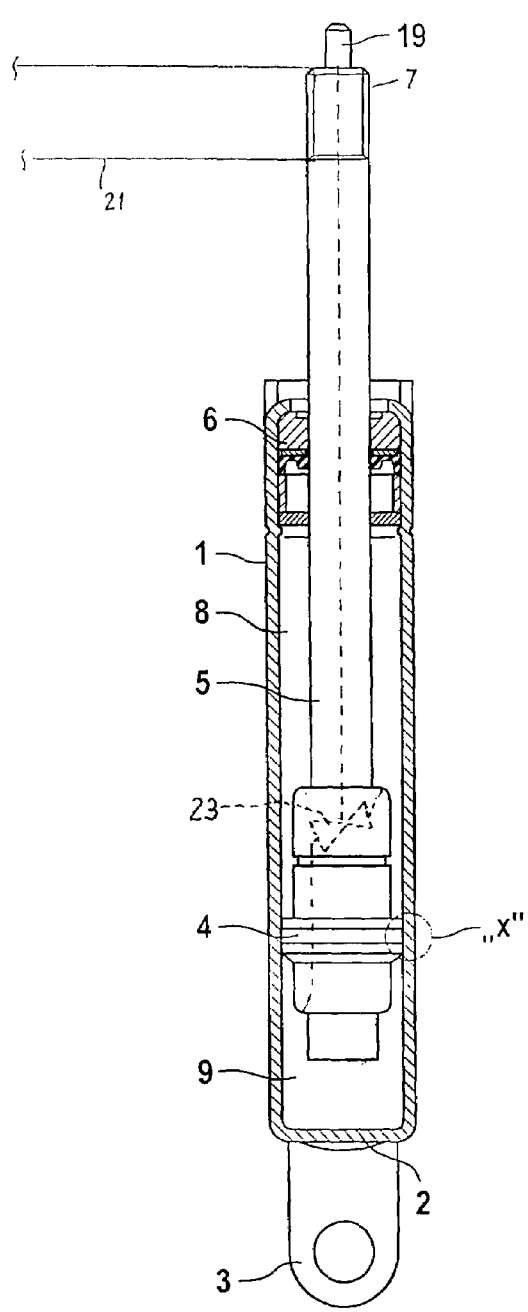
FIG. 1 is a cross sectional view through a pneumatic spring according to an embodiment of the present invention.
Figure 2:
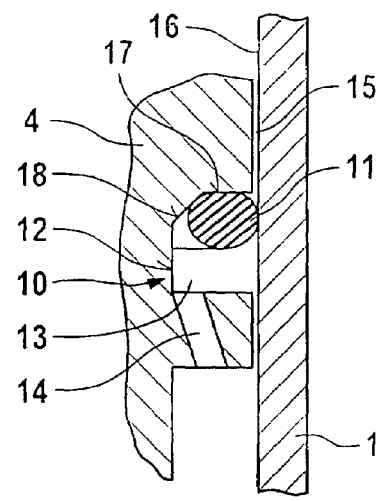
FIG. 2 is an enlarged detail "x" of the pneumatic spring according to FIG. 1 in the region of the piston with the valve closed.
Figure 3:
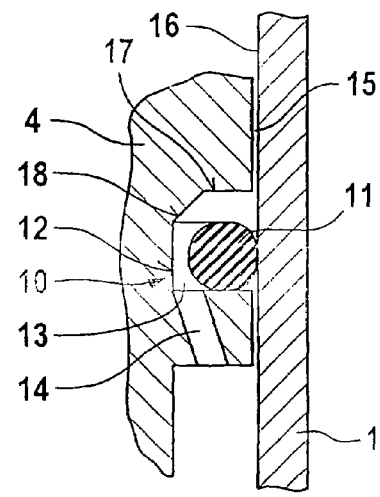
FIG. 3 is the detail "x" according to FIG. 2 with the valve open.

The pneumatic spring in FIGS. 1–3 is an upright of a table. The pneumatic spring includes a cylinder 1 having a bottom end closed by a base 2 and a fastening element 3 for fastening a foot part (not illustrated) of the table.

A piston 4 is displaceably arranged in the cylinder 1. The piston 4 is provided, at one end, with a piston rod 5 having a top end guided outwards, with sealing action, through a sealing guide unit 6 which closes the top end of the cylinder 1.

A table top 21 of the table is fastened at the top end 7 of the piston rod 5. The piston 4 divides the interior of the cylinder 1 into a top cylinder chamber 8 and a bottom cylinder chamber 9, which are both filled with a gas under positive pressure.

Since the active surface of the piston 4 on the side which is directed towards the top cylinder chamber 8 is smaller, by the cross-sectional surface area of the piston rod 5, than on the side which is directed towards the bottom cylinder chamber 9, the piston 4 is subjected to an upwardly directed push-out force by the gas pressure.

This upwardly directed push-out force is counteracted in the downward direction by a weight-induced force of the table top 21 which corresponds approximately to the push-out force, with the result that the piston 4 and thus also the non-loaded table top are located in a floating position.

As is illustrated in the detail "x" from FIG. 1 which is illustrated in FIGS. 2 and 3, a radially encircling groove 10 having a base 12 and two side walls is formed on the radially encircling lateral surface of the piston 4. An elastomeric sealing ring 11 with an axial extent which is smaller than that of the groove 10 is arranged therein an axially movable manner.

The external diameter of the sealing ring 11 corresponds approximately to the internal diameter of the cylinder 1.

An annular space 13 is formed between the base 12 of the groove 10 and the radially encircling inner surface of the sealing ring 11, wherein the annular space 13 is connected to the bottom cylinder chamber 9 via connecting channels 14 formed in the piston 4.

A connection between the groove 10 and the top cylinder chamber 8 is formed by an annular gap 15 between the radially encircling lateral surface of the piston 4 and the inner wall 16 of the cylinder 1 on that side of the groove 10 which is directed towards the top cylinder chamber 8.

The side wall 17 of the groove 10 which faces toward the top cylinder chamber 8 has a region 18 which is directed towards the base 12 of the groove that is inclined in the direction of the top cylinder chamber 8.

If the piston rod 5 is only subjected to loading by the weight-induced force of the table top, the valve which is illustrated in FIGS. 2 and 3 is located in the position which is illustrated in FIG. 3. In this case, the annular space 13, in addition to being connected to the bottom cylinder chamber 9 via the connecting channels 14, is also connected to the top cylinder chamber 8 via the annular gap 15, with the result that the two cylinder chambers 8 and 9 are also connected to one another. The piston 4 and the table top are in a floating state here. If the table top, and thus also the piston 4, is then loaded in the upward direction by a force, which may be very small, the table top and piston 4 are moved smoothly upwards since gas can flow freely out of the top cylinder chamber 8, through the annular gap 15, the annular space 13 and the connecting channels 14, into the bottom cylinder chamber 9.

The table top can thus be raised easily. This is particularly advantageous if the table is used for a hospital bed and the table top projects beyond the hospital bed. If the hospital bed is raised and strikes against the table top from beneath, then the table top also moves upwards without any significant resistance. The table is not tipped over and objects which are located on the table top remain in position.

If there are such objects located on the table top, then their weight sets an opposing force against the upwardly directed push-out force of the bottom cylinder chamber 9. This weight-induced force initiates a displacement movement of the table top and piston 4, in which case gas tries to flow into the top cylinder chamber 8 from the bottom cylinder chamber 9. In response, the piston 4 begins to move and the gas begins to flow toward the top cylinder chamber 8 and the sealing ring 11 is immediately moved out of its position which is illustrated in FIG. 3 into the position which is illustrated in FIG. 2. In the position shown in FIG. 2, the sealing ring 11 closes the annular gap 15, with the result that it is not possible for any gas to flow from the bottom cylinder chamber 9 into the top cylinder chamber 8 and for the piston 4 and the table top to be lowered. This procedure takes place quickly enough for lowering of the table top not to be detectable in practice.

The sealing ring 11 here is pressed axially against the side wall 17 by the increased pressure in the bottom cylinder chamber 9, and radially outwards against the inner wall 16 of the cylinder 1 by the inclined region 18 of the side wall 17, and elastically deformed, this ensuring reliable closure of the annular gap 15.

For lowering the table top, a valve tappet 19 is manually activated in the axial direction from the outside. The valve tappet 19 is guided through a coaxial bore in the piston rod 5 and projects at the top end 7 of the piston rod 5 for manual activation.

The bottom end of the valve tappet 19 acts on a connecting valve 23 which is arranged in the piston 4 and then opens the valve through-passage thereof.

The valve tappet 19 allows gas to flow out of the bottom cylinder chamber 9 into the top cylinder chamber 8 and for the piston 4 and the table top 21 to be lowered.

Since the closing member of the connecting valve 23 is forced in the closing direction by the pressure of the bottom cylinder chamber 9, the connecting valve 23 closes as soon as manual actuation of the valve tappet 19 ceases.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for supporting a height-adjustable component comprising an approximately vertically extending upright which bears the component and includes a pneumatic spring, said pneumatic spring comprising a cylinder having a bottom end and a top end, said bottom end being connectable to a fixed portion of said arrangement, a piston displaceably arranged in said cylinder and dividing said cylinder into a bottom cylinder chamber and a top cylinder chamber, a piston rod connected to said piston, said piston rod projecting through said top cylinder chamber and being guided out of said top end of said cylinder, said piston rod having a free end for bearing the component, said top and bottom cylinder chambers having a gas filling under pressure which exerts a upwardly directed push-out force on said piston which is approximately equal in magnitude to an opposing weight-induced force of the component on said piston, a valve arranged in said piston for allowing a flow of gas from said top cylinder chamber into said bottom cylinder chamber and blocking a flow of gas from the bottom cylinder chamber into said top cylinder chamber, and a manually actuable connecting valve arranged in said pneumatic spring for selectively connecting said top and bottom cylinder chambers to one another, wherein said connecting valve and said valve arranged in said piston prevent inward movement of said piston and lowering of the component in response to an additional compressive force exerted on said piston when said connecting valve is closed, the additional compressive force being additional to the weight-induced force of the component on said piston.

2. The arrangement of claim 1, wherein said piston comprises a radially outward facing lateral surface encircling said piston, a radially encircling groove defined in said radially encircling lateral surface and having a first connection to said bottom cylinder chamber and a second connection to said top cylinder chamber, an elastomeric sealing ring with a smaller axial extent than said groove is axially movably arranged in said groove, wherein said second connection is blockable by said sealing ring when a push-in force is applied to said pneumatic spring.

3. The arrangement of claim 2, wherein an external diameter of said sealing ring corresponds approximately to an internal diameter of said cylinder.

4. The arrangement of claim 3, wherein said second connection between said groove and said top cylinder chamber is an annular gap between the radially encircling lateral surface of said piston and an inner wall of said cylinder on a side of said groove facing said top cylinder chamber.

5. The arrangement of claim 4, wherein said groove comprises a blind end and two side walls, the side wall on a side of said groove directed towards said top cylinder chamber being at least partially inclined in the direction of said top cylinder chamber.

6. The arrangement of claim 2, wherein said groove comprises a blind end, and wherein an annular space is defined between said blind end of said groove and a radially encircling inner surface of said sealing ring, the annular space being connected to said bottom cylinder chamber.

7. The arrangement of claim 2, wherein said first connection comprises a connecting channel defined in said piston connecting said groove to said bottom cylinder chamber.

8. The arrangement of claim 1, further comprising a manually displaceable valve tappet displaceably guided in a coaxial bore in said piston rod toward the free end of the piston rod, wherein said connecting valve is arranged in said piston and is actuatable by said manually displaceable valve tappet.

9. The arrangement of claim 1, wherein said connecting valve forced in a closed position by pressure in said bottom cylinder chamber.

10. The arrangement of claim 1, further comprising a sealing guide unit arranged at said top end of said cylinder through which said piston rod is sealingly guided.

11. The arrangement of claim 1, further comprising a base arranged at said bottom end of said cylinder, said base closing said bottom end of said cylinder.

12. The arrangement of claim 1, further comprising a foot part, wherein said bottom end of said cylinder is connected to said foot part.

13. The arrangement of claim 1, where said height-adjustable component comprises a table top.

\* \* \* \* \*